United States Patent [19]

Barouh et al.

[11] 4,092,280

[45] May 30, 1978

[54] COMPOSITION FOR A TYPEWRITER RIBBON HAVING DELAYED ALTERATION RESISTANCE

[76] Inventors: Victor Barouh, 111 Wheatley Rd., Old Westbury, N.Y. 11568; George Rottmann, 8 Valentine Hill, Sparkell, N.Y. 10976; Sylvester Giaccone, 99-05 59th Ave., Flushing, N.Y. 11368

[21] Appl. No.: 670,784

[22] Filed: Mar. 26, 1976

[51] Int. Cl.$^2$ .................. C08K 5/00; C09D 11/10
[52] U.S. Cl. .................. 260/23 XA; 260/30.6 R; 260/31.8 C; 260/31.8 N; 260/31.8 G; 260/31.8 H; 260/32.8 N; 260/33.4 R; 260/33.6 R; 260/37 N; 260/37 NP; 260/42.21; 427/141; 428/914
[58] Field of Search .................. 106/23; 427/141, 153, 427/152; 428/914; 260/42.12, 37 N, 23 R, 23 XA, 30.6 R, 31.8 G, 31.8 H, 32.8 R, 33.4 R, 33.6 R, 31.8 C; 197/181

[56] References Cited

U.S. PATENT DOCUMENTS

| | | | |
|---|---|---|---|
| 3,413,184 | 11/1968 | Findlay et al. | 428/305 |
| 3,623,908 | 11/1971 | Hermann et al. | 427/141 |
| 3,682,683 | 8/1972 | Elbert et al. | 428/914 |
| 3,724,633 | 4/1973 | Korb et al. | 197/181 |

FOREIGN PATENT DOCUMENTS

| | | | |
|---|---|---|---|
| 245,397 | 6/1963 | Australia | 427/153 |
| 732,194 | 6/1955 | United Kingdom | 106/23 |
| 748,265 | 4/1956 | United Kingdom | 427/153 |

OTHER PUBLICATIONS

Bailey et al., "Unitary Correction Tape", IBM Technical Disclosure Bulletin, vol. 13, No. 11, Apr. 1971, p. 3460.

*Primary Examiner*—Allan Lieberman
*Attorney, Agent, or Firm*—Ladas, Parry, Von Gehr, Goldsmith & Deschamps

[57] ABSTRACT

A composition for a correctable typewriter ribbon adapted to be adhesively lifted off from the typing bond to which it is transferred for a short period of time, after which the alteration resistance of a typed indicia changes so that an adhesive lift off operation fails to remove the visible image from the typing bond.

3 Claims, No Drawings

COMPOSITION FOR A TYPEWRITER RIBBON HAVING DELAYED ALTERATION RESISTANCE

BACKGROUND OF THE INVENTION

1. Field of the Invention

This invention relates to an adhesively correctable film typewiter ribbon having delayed alteration resistance which is especially adapted for use in conjunction with an adhesive typewriter ribbon of the type that is used to lift off a type indicia of non-absorbent and non-wetting ink compositions. The delayed alteration typewriter ribbon is especially adapted for use with a typewriter such as the Correcting Selectric typewriter manufactured by International Business Machine Corporation. This invention eliminates adhesive lift off of a typewritten character from the typing bond after a predetermined time duration.

2. Description of the Prior Art

Various formulations for adhesive correctable film typewriter ribbons have been heretofore been constructed. Such ribbons are capable of being utilized to imprint a letter on a piece of typing bond and are susceptible to adhesive removal without damage to the bond. These prior art ribbons are made of hard, film forming resins which are modified through the addition of additives which imbrittle the film and make the resin adherent to the imaging surface while not penetrating into the fibers of the paper that is typed upon.

Prior art film ribbons utilize non-absorbent ink compositions of transfer materials, which do not wet or dye the paper onto which indicia are placed. Accordingly, this makes possible the use of adhesive materials for correcting an error by removing the undesired typed character with an adhesive tape carried by the typewriter. Furthermore, adhesive lift off removal of typewritten characters made by prior art ribbons is possible for substantially an indefinite period of time. Known correctable typewriter ribbons do not wet the typing bond after being deposited thereon by mechanical force and accordingly adhesive removal was possible even after the passage of long periods of time as the character did not penetrate into the fibers of the paper.

In the past, there have been various attempts to increase the attachment of a lift off removable typewritten character as time passes, however, these prior art ribbons do not leave a visible image after being adhesively removed after long periods of time have passed.

It is further known to provide a typewriter with a ribbon that incorporates ink of the type that is capable of penetrating into the paper fibers and staining or permanently dyeing the paper upon being printed thereon. However, adhesive removal of such an indicia was not possible at any time, and the fibers of the paper had to be physically removed from the surface of the paper to remove the image.

The difficulty involved with known typewriter ribbons is that none have been found to be readily adhesively correctable shortly after being typed, and yet exhibiting a delayed alteration resistance at a later time.

SUMMARY OF THE INVENTION

This invention overcomes the disadvantage of the prior art typewriter ribbons by providing a means to form a typewritten indicia that is readily removable for a short period of time, after which a staining occurs which penetrates into the fibers of the typing bond and accordingly prevents adhesive removal of the image created.

The structure of this invention features the use of an ink formulation that is adhesively removable and includes a water-soluble dye. The ink surface is coated on a suitable substratum such as polyethylene, or the like and the typewriter ribbon may then be rolled onto a spool or placed in a cartridge if desired.

It is an object of the present invention to provide a film typewriter ribbon to produce a character that may be adhesively removed just subsequent to being placed upon typing paper, and sometime thereafter displaying a visible image if adhesive erasure attempts are made. The correctable film typewriter ribbon having delayed alteration resistance features an ink formulation that is coated upon any suitable substratum. The ink formulation should have sufficient qualities to adhere to a typing paper when physically pressed thereagainst, but susceptible to immediate adhesive lift off removal, as is known in the art.

It is still another object of the present invention to provide a film typewriter ribbon wherein the migration of dye in the ink composition will migrate very gradually toward the surface of the typing paper. The migration of the dye leaving a discernible image on the paper only upon removal occuring after approximately five minutes.

Furthermore, it is still a further object of the present invention to provide a correctable typewriter ribbon wherein after approximately forty-five minutes there is a maximum migration of dye into the paper leaving an image thereon that is substantially permanent. Accordingly, as time moves on its becomes progressively more difficult to remove a visible typewritten image produced by a ribbon of the present invention upon adhesive removal.

It is a further object of the present invention to provide a simple and inexpensive formulation and method of making a correctable film typewritter ribbon having delayed alteration resistance for use with various types of typewriter bond paper.

The foregoing together with various ancillary objects, features and advantages of the present invention will become apparent from the following description of preferred embodiments which are described herein.

DETAILED DESCRIPTION OF THE INVENTION

The following description of the function of particular materials represents what is believed to be the best explanation in as much as the complete interaction is known and understood.

The ribbon includes an ink layer of a transfer medium which is coated upon any substratum which is preferably manufactured of a synthetic flexible material such as cellophane, mylar film, polyethylene and the like. Furthermore, the ink formulation may be coated on any suitable material such as nylon, acetate, and paper or the like, of any suitable thickness. The ink coating may be coated by any conventional method which is found suitable for the formulation herein set forth.

The ink layer of the transfer medium is selected from materials which provide the initial quality of being adhesively removable from the image sheet onto which the ink has been transferred in the process of typewriting. The basic ink layer formulation consists of a resin, compatible plasticizer and solvents which are charged into a ball mill with the proper charge of balls and mixed until dissolved. Example I below sets forth a preferred base ink layer formulation.

EXAMPLE I 8.75 parts Emery 1533, Emery Industries Polyamid resin 12.00 parts Dioctyl Phthalate
20.25 parts Isopropanol 99%
10.00 parts Toluol All the following pigments are then added to the resin solution in the ball mill and dispersed for approximately 2¼ hours.

3.00 parts Black Toner F8200
4.00 parts Raven Black 1255

A solution of 2.25 parts non-ferrous tannic acid in 10 parts isopropanol and 5 parts toluol is made separately and this solution, along with 6 parts HB40 (Monsanto Chemical Co.) and 1.5 parts Petrolatum are added to the resin solution and pigments in the ball mill and dispersed for an additional 20 minutes. The ink is then discharged from the ball mill. The ball mill is jacketed, with cold water running through the jacket to prevent heat and pressure build up. Before coating, the ink is reduced to a viscosity of 20 (Zahn cup #2) seconds by a solvent mixture of 50% isopropanol and 50% toluol. In the fountain system of the coating machine, this viscosity is automatically maintained by a Norcross Viscometer throughout the coating process.

The coating itself may be applied by a roller and wire bar combination to yield a dry coating weight of one and ¼ pounds per 3,000 square foot on a ¾ mil high density polyethylene substrate, or the like.

It has been found that an adhesively correctable ink formulation might include several polymeric materials such as butyrates, vinyls, vinyl copolymers, acrylics, styrenes and polyamids. However, it is important that a resin be utilized that can be blended with an incompatible plasticizer so that it has a brittleness that is suitable to be removed by an adhesive correcting tape. Into the resin and plasticizer, coloring pigments are added and dispersed in the resinous solution. The quantity of plasticizer is important as it alters the adhesion of the ink to the substratum which is important if a clear indicia is to be produced upon impact by a typewriter element.

In order to cause the ink layer to be released properly from the substratum by means of the type font, it is necessary to destroy the integrity of the coating. Accordingly, Monsanto Chemical Company HB-40, which is a non-volatile high molecular weight hydrocarbon liquid, or more specifically hydrogenated terphenyl, was found to be suitable for this effect when blended with petrolatum. The HB-40 material is compatible with the resin in the ink mixture, but is incompatible with the resin after the ink is coated on the substratum and dried by evaporation of the solvents.

With respect to the coloring ingredients in the ink formulation, a mixture of carbon black of the Columbian Division of Cities Service Company designated Raven 1255 and black toner designated F8200 by the Paul Uhlich Co. may be used to produce a sharp indicia. The strength and cohesion of the coating is increased when carbon black is used as the only coloring ingredient, resulting in lack of sharpness and definition of the typed characters. By combining the Black Toner and the Carbon Black in the arrived at proportions, suitable results may be obtained.

Non-ferrous tannic acid in the correctable ink acts as a complement to the polyamid resin. It increases the brittleness of the ink coating without having a film forming tendency or sacrificing definition of the typed characters. This additional brittleness enhances the cleanliness and undetectability of an error that is immediately removed by an adhesive correcting tape.

It must be noted that the formulation of the ink is important as the ink formulation once coated on a suitable substratum such as polyethylene, may be manufactured into a typewriter ribbon. Therefore, the formulation must be suitable for slitting and winding onto ribbon spools, or the like.

Although the ink is completely homogenous during the coating process, the partial incompatability of ingredients renders the dry coating discontinuous after all the solvents are evaporated. It can be postulated that these incompatible materials encapsulate the other solids on the substratum. This is an acceptable explanation since by observing the ink coating on the substratum it is apparent that the ink remains thereon very loosely. Upon impact of a type font, and transfer of indicia from the ribbon to the paper, the indicia still has enough internal cohesion and is sufficiently continuous and brittle to be removed by an adhesive correcting tape.

In order to create a correctable typewriter ribbon having delayed alteration resistance, water-soluble dyestuff may be added to the basic ink formula which does not effect the performance of the correctable ribbon with respect to the definition of the typewritten character or the initial immediate removal of the character by an adhesive tape. However, after a period of time the dyestuff migrates gradually into the underlying paper and stains the paper beneath the character image. The staining effect is obscured by the character image which is laying on top of the surface of the paper and is not discernible unless it is attempted to adhesively remove the typed character at a period of time after being placed upon the typing bond.

A discernible image may be created on the paper upon the removal of a typewritten character about five minutes after being typed, and reaches a maximum staining approximately 48 hours thereafter. In other words, if five minutes after an image is typed adhesive removal is attempted, there is a faint image left on the typing bond after the bulk of the indicia is lifted off. However, if the typed indicia is not disturbed for several hours, the image left behind after a lift off operation is substantially more discernible than after said five minute period. As time moves on it becomes progressively more difficult to remove a visable typewritten image as an underlying impression or stain is present even after the major portion of the ink is removed.

The delayed alteration correctable ribbon is produced by the addition of a water-soluble dye at the last stage of manufacture of the basic correctable ink formulation. The dye is essentially undissolved at this point and remains so after coating on a substratum. In this undissolved form the dye lacks the ability to immediately stain the paper beneath the character image, but does so after a certain period of time.

The speed of the migration of the dye, depends, to some extent, on the absorptive qualities of the underlying substratum as well as its moisture content. Depending on the kind of paper used, the dye content of the ribbon can be varied so as to produce a greater or lesser dye image, or a slower or faster rate of migration.

Dyestuff suitable for the present invention is Victoria Blue (C1729), or Alphazurine Blue (C.I. 671). Victoria Blue is a basic dye of the triphenylmethane type. Alphazurine Blue is an acid dye related to the basic dyes, of the triphenylmethane type. Both dyes are water-soluble and both are very brilliant and of great tinctorial power. They are very readily dispersed in the correctable base ink formulation without any evidence of incompatibility, although they are insoluble in the combination of components herein set forth.

The dyestuff may be added to the ink formulation in an amount from approximately 5% to an extremely slight and negligible amount. The addition of 1% dyestuff is large if immediate removal of the indicia by an adhesive correcting tape is anticipated. A percentage in the range of 0.2% was found to be desirable as it does not effect the quality of the correction when removal was executed immediately or within five minutes thereafter.

However, this percentage has been found to be acceptable with most suitable typing papers as a stain was left upon the paper upon adhesive lift off after five minutes. However, it has been found that after 16 hours the staining increases to a maximum after which the passage of time does not increase the amount of the dye penetration into the paper. A range of from 0.1% to 5.0% is therefore desirable.

Both Victoria Blue and Alphazurine Blue respond substantially similarly with respect to the time that is needed for the development of the stain in the ink formula. But due to the greater tinctorial strength of the Victoria Blue, this dye is preferred.

The solubility characteristics of the dyes is extremely important to the delayed alteration resistance of the ink formula. The dyes must have no solubility in any of the liquid components of the base ink formula either before or after the ink is applied to the substratum. Furthermore, the dyes must be dispersed in the ink without being dissolved. Victoria Blue is soluble in both isopropyl alcohol and dioctyl phthalate. It is not soluble in toluene, HB-40 plasticizer, or petrolatum. Therefore, there is evidently sufficient toluene, HB-40 and petrolatum in the ink to render Victoria Blue insoluble. With respect to the Alphazurine Blue, this dye is soluble solely in water. These dyes remain in both the ink solution as well as in the dye coating residue in the undissolved form indefinitely, provided they are free of any moisture. In both cases, when the character images are typed on paper the dyes are attracted by the normal moisture content of the paper and migrate thereto because of their hygroscopic nature. They are dissolved by the moisture and in the dissolved form, appreciably stain the paper below the character image, which becomes evident when the characters formed from the base ink formula are removed by an adhesive correcting step. As staining is not an immediate reaction, but occurs over a period of time, a correctable film ribbon with a delayed alteration resistance may be achieved.

It will be understood that only the dyestuff has the ability to penetrate the typing bond whereas the basic ink formula which comprises the majority of a typed indicia merely engages the surface of the paper and does not have the ability to penetrate into the paper.

It has been found that many base ink formulations will function to produce a delayed alteration resistance indicia when small amounts of water-soluble dyestuff are added thereto, the following being additional examples thereof:

EXAMPLE II 8 parts polyamide, P1560 from Lawter Chemical Co.
17 parts HB-40
22 parts Toluol
22 parts Isopropanol
grind until dissolved, then add:
9 parts Peerless Black 1255
grind over night.

EXAMPLE III 52 parts Methyl Ethyl Ketone
6 parts Tricresyl Phosphate
6 parts Vinyl Acetate-Vinyl Chloride Copolymer
13 parts Oleic Acid
15 parts Peerless Black 1255
mixed for ½ hour A latitude of modification, substitution and change is intended in the foregoing disclosure and in some instances, some features of the invention may be employed without corresponding use of other features and ingredients.

What is claimed is:

1. A delayed alteration resistance ink composition consisting substantially of approximately 8.75 parts polyamide resin, 12.00 parts dioctyl phthalate, 30.25 parts isopropanol, 15.00 parts toluol, 3.00 parts toner, 4.00 parts pigment, 2.25 parts non-ferrous tannic acid, 6 parts hydrogenated terphenyl, and 1.5 parts peltrolatum, and 1 part water-soluble hiphenylmethane dye which is capable of migrating gradually into typing bond after the delayed alteration resistance ink composition has been placed in contact therewith, and which triphenylmethane dye has no solubility in any of the liquid components of said delayed alteration resistance ink composition.

2. A delayed alteration resistance ink composition consisting substantially of approximately 8 parts polyamide resin, 17 parts hydrogenated terphenyl, 22 parts toluol, 22 parts isopropanol, 9 parts pigment, and 1 part watersoluble hyphenylmethane dye which is capable of migrating gradually into typing bond after the delayed alteration resistance ink composition has been placed in contact therewith, and which triphenylmethane dye has no solubility in any of the liquid components of said delayed alteration resistance ink composition.

3. A delayed alteration resistance ink composition consisting substantially of approximately 52 parts methyl ethyl ketone, 6 parts tricresyl phosphate, 6 parts vinyl acetate-vinyl chloride copolymer resin, 13 parts oleic acid, 15 parts pigment, and 1 part water-soluble triphenylmethane dye which is capable of migrating gradually into typing bond after the delayed alteration resistance ink composition has been placed in contact therewith, and which triphenylmethane dye has no solubility in any of the liquid components of said delayed alteration resistance ink composition.

* * * * *